(12) United States Patent
Cho et al.

(10) Patent No.: US 7,283,559 B2
(45) Date of Patent: Oct. 16, 2007

(54) TRANSMITTING/RECEIVING APPARATUS AND METHOD FOR PACKET DATA SERVICE IN A MOBILE TELECOMMUNICATION SYSTEM

(75) Inventors: Young-Kwon Cho, Suwon-shi (KR); Jae-Sung Jang, Kwacheon-shi (KR)

(73) Assignee: Samsung Electronics Co., Ltd. (KR)

( * ) Notice: Subject to any disclaimer, the term of this patent is extended or adjusted under 35 U.S.C. 154(b) by 986 days.

(21) Appl. No.: 10/032,576

(22) Filed: Dec. 27, 2001

(65) Prior Publication Data
US 2002/0122431 A1    Sep. 5, 2002

(30) Foreign Application Priority Data
Dec. 27, 2000    (KR) ............................... 2000-83395

(51) Int. Cl.
*H04J 3/22* (2006.01)
(52) U.S. Cl. ...................................... 370/465; 370/328
(58) Field of Classification Search ................ 370/468, 370/455, 335, 342, 465, 252
See application file for complete search history.

(56) References Cited

U.S. PATENT DOCUMENTS

| | | | |
|---|---|---|---|
| 6,088,335 A | 7/2000 | I et al. | |
| 6,253,063 B1 | 6/2001 | Cudak et al. | |
| 6,452,936 B1 * | 9/2002 | Shiino | 370/441 |
| 2001/0017851 A1 | 8/2001 | Yamaguchi et al. | |
| 2002/0097780 A1 * | 7/2002 | Odenwalder et al. | 375/146 |

FOREIGN PATENT DOCUMENTS

| | | |
|---|---|---|
| EP | 0 986 282 A1 | 3/2000 |
| EP | 1 043 910 A2 | 10/2000 |
| WO | WO 00/14900 | 3/2000 |

OTHER PUBLICATIONS

European Search Report dated Apr. 3, 2003, issued in a counterpart application, namely, Appln. No. 01272383.9.

* cited by examiner

*Primary Examiner*—Brian Nguyen
(74) *Attorney, Agent, or Firm*—The Farrell Law Firm, P.C.

(57) ABSTRACT

There are provided a transmitting/receiving apparatus and method for packet data service in a mobile telecommunication system. To determine the transmission format of packet data between a first format and a second format longer than the first format based on at least one channel state value received from a mobile station, received channel state values are sequentially stored. Then, the differences between all adjacent channel state values are calculated and summed. The sum is compared with a predetermined threshold. If the sum is greater than or equal to the predetermined threshold, the transmission format of the packet data is determined as the first format. If the sum is less than the predetermined threshold, the transmission format of the packet data is determined as the second format.

15 Claims, 10 Drawing Sheets

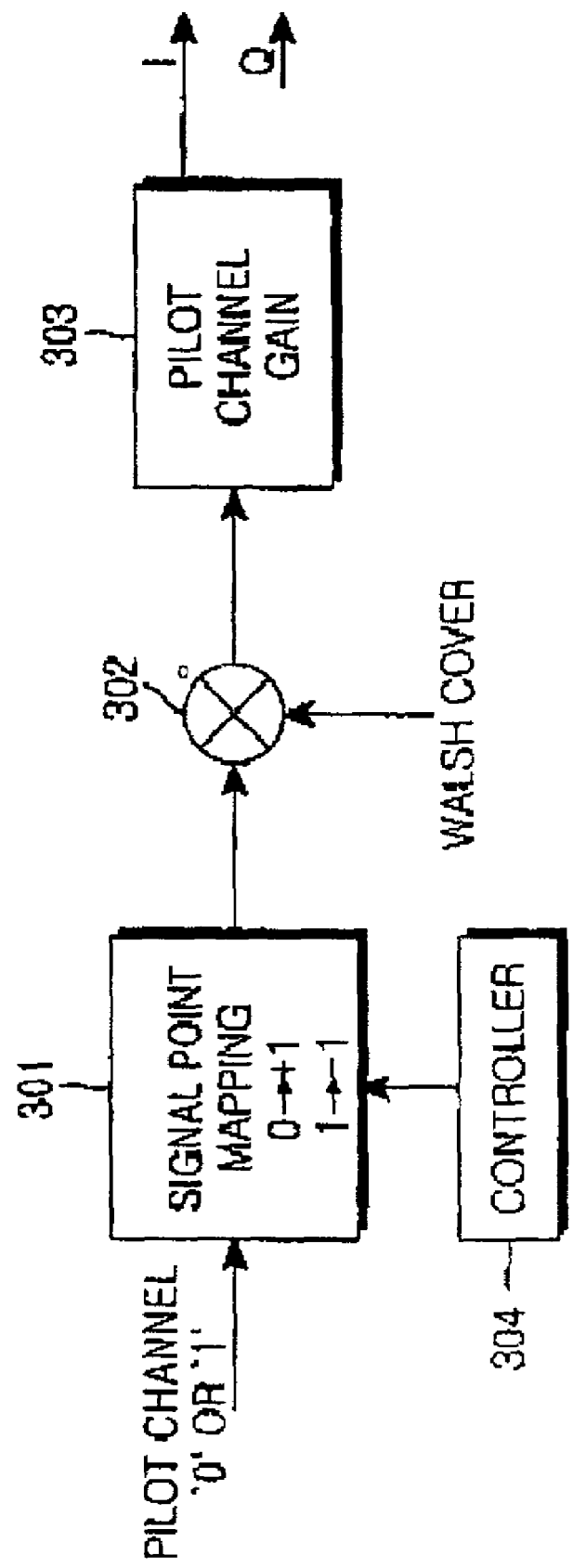

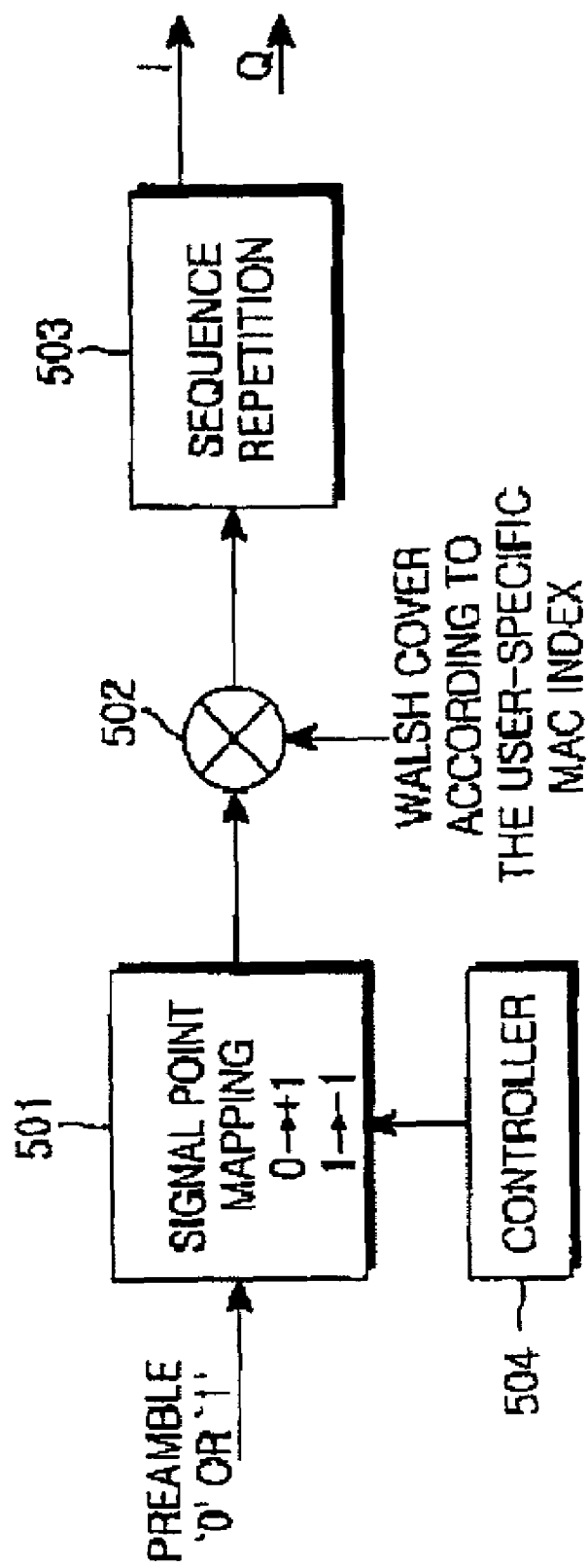

TRANSMITTING/RECEIVING APPARATUS AND METHOD FOR PACKET DATA SERVICE IN A MOBILE TELECOMMUNICATION SYSTEM

PRIORITY

This application claims priority to an application entitled "Transmitting/Receiving Apparatus and Method for Packet Data Service in a Mobile Telecommunication System" filed in the Korean Industrial Property Office on Dec. 27, 2000 and assigned Serial No. 2000-83395, the contents of which are hereby incorporated by reference.

BACKGROUND OF THE INVENTION

1. Field of the Invention

The present invention relates generally to a data transmitting apparatus and method in a mobile telecommunication system supporting multimedia service, and in particular, to an apparatus and method for transmitting data in a single format or in a double format.

2. Description of the Related Art

In general, a conventional CDMA (Code Division Multiple Access) mobile telecommunication system such as IS-2000 supports voice service only. To meet the users' growing demands, mobile communication technology has been developed to provide data service. A so-called HDR (High Data Rate) system supports only high rate data service. In other words, the conventional mobile communication systems support either voice service or data service alone, even though it may be desirable to support both services need simultaneously. Therefore, there is a need of a mobile telecommunication system capable of additionally supporting data service as well as the conventional voice service.

In order to satisfy the requirement, the mobile telecommunication system has been evolved to support service including the voice and data services using the same frequency band. More specifically, voice service is provided to a plurality of users in CDMA, whereas data service is supported basically in time division and CDMA is adopted in time slots assigned to a particular user. In such a system, data transmission occurs on a PLP (Physical Layer Packet) basis and a PLP can be constructed in a single format or a double format for the same data rate.

An increase in the size of an encoding block also increases a gain from turbo interleaving and channel interleaving. For the same data rate, better reception performance can be expected from transmission of a double-formatted PLP than from transmission of a single-formatted PLP. However, this characteristic is ensured only under a good mobile telecommunication channel environment where a sufficient gain can be obtained from turbo interleaving and channel interleaving. In other words, data transmission in the double format may increase a packet error probability as compared to data transmission in the single format.

Concerning data service, ARQ (Automatic Repeat request) is used to ensure a QoS (Quality of Service) at or above an acceptable level. As an increased packet error probability increases the number of retransmissions in ARQ, data transmission efficiency is decreased. Considering data transmission efficiency for a particular user and in the whole system, it is preferable to transmit data in the single format under an unstable, bad channel environment.

SUMMARY OF THE INVENTION

It is, therefore, an object of the present invention to provide an apparatus and method for transmitting downlink and uplink signals for efficient packet data service in a mobile telecommunication system supporting a service including voice service and data service.

It is another object of the present invention to provide an apparatus and method for efficiently transmitting PLP data in a single format or in a double format in a mobile telecommunication system supporting multimedia service.

It is a further object of the present invention to provide an apparatus and method for enabling stable transmission of PLP data in a mobile communication system to thereby increase system efficiency.

It is still another object of the present invention to provide an apparatus and method for transmitting PLP data in a single format or a double format according to a channel environment, and an apparatus and method for reporting the format of transmitted data to a mobile station in a mobile telecommunication system supporting multimedia service.

The foregoing and other objects of the present invention are achieved by providing a transmitting/receiving apparatus and method for packet data service in a mobile telecommunication system. To determine the transmission format of packet data between a first format and a second format longer than the first format based on at least one channel state value received from a mobile station, received channel state values are sequentially stored. Then, the differences between all adjacent channel state values are calculated and summed. The sum is compared with a predetermined threshold. If the sum is greater than or equal to the predetermined threshold, the transmission format of the packet data is determined as the first format. If the sum is less than the predetermined threshold, the transmission format of the packet data is determined as the second format.

BRIEF DESCRIPTION OF THE DRAWINGS

The above and other objects, features and advantages of the present invention will become more apparent from the following detailed description when taken in conjunction with the accompanying drawings in which:

FIG. 5A is a partial block diagram of an embodiment of a downlink transmitter for transmitting information needed to determine the format of a PLP between a single format and a double format on a modified PICH;

FIG. 6A is a partial block diagram of another embodiment of the downlink transmitter for transmitting information needed to determine the format of a PLP between a single format and a double format on a modified PSCH;

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

In accordance with the present invention, a base station determines whether to construct and transmit a PLP in a single format or in a double format on the basis of the change history of a mobile station-requested data rate. A mobile station selects an optimum data rate periodically according to a downlink reception CIR (Carrier to Interference Ratio) which varies with time and transmits an index representing the optimum data rate to the base station. It is assumed here that as the index is higher, its corresponding data rate is also higher. If the mobile station-requested data rate changes greatly, this implies that the mobile station moves quite fast in an unstable channel environment. In this situation, it is preferable to transmit data in the single format rather than in the double format for the same data rate. On the other hand, if the mobile station requests almost the same data rate for a predetermined time period, which implies that the mobile station is almost stationary in a stable channel environment, it is preferable to transmit data in the double format rather than in the single format.

There will be given a detailed description of the structure and operation of an apparatus for discriminating between the single format and the double format according to the present invention.

Figure 1A:
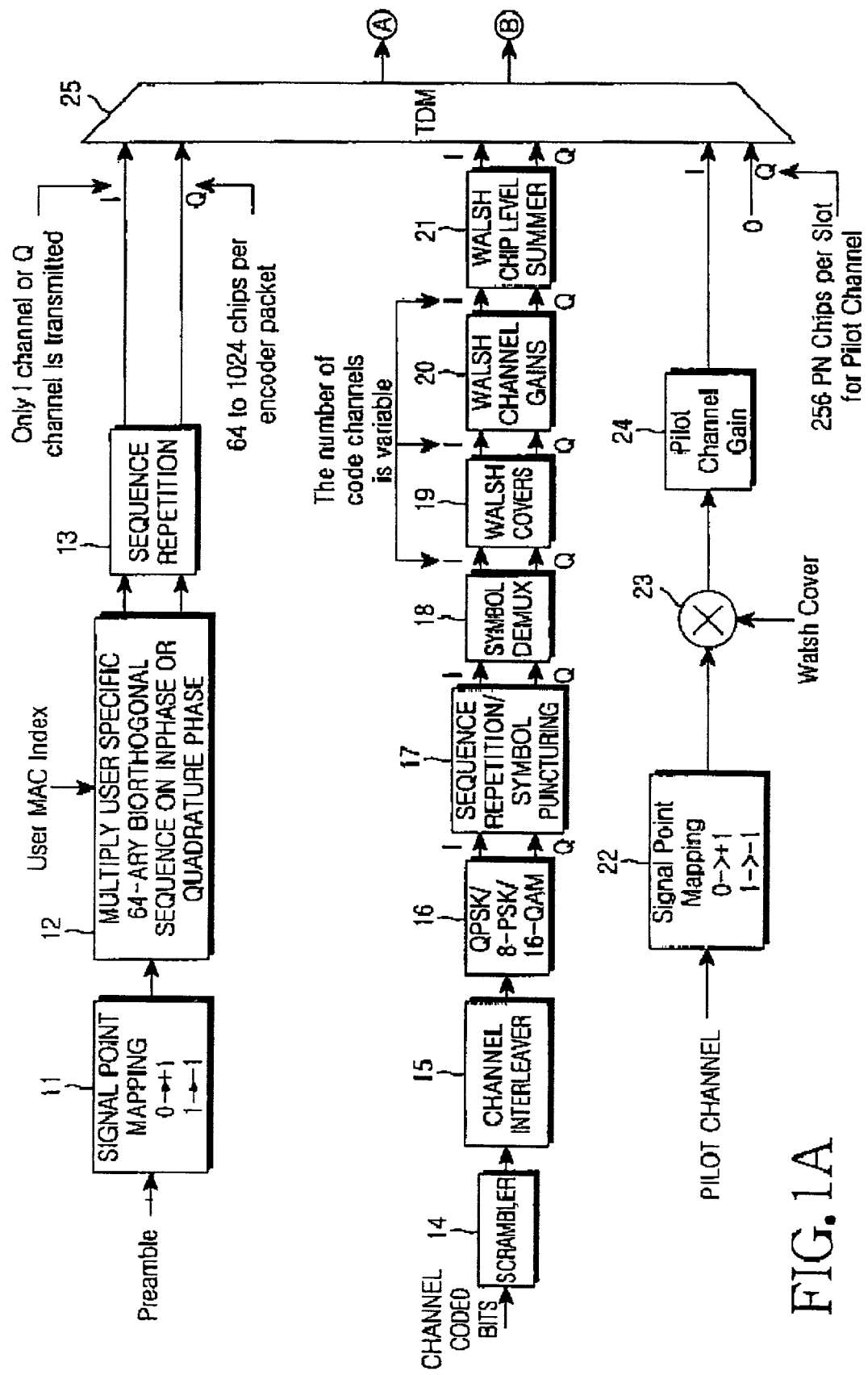
FIGS. 1A and 1B are block diagrams of a downlink transmitter for transmitting a data traffic channel (DTCH) according to the present invention.
Figure 1B:
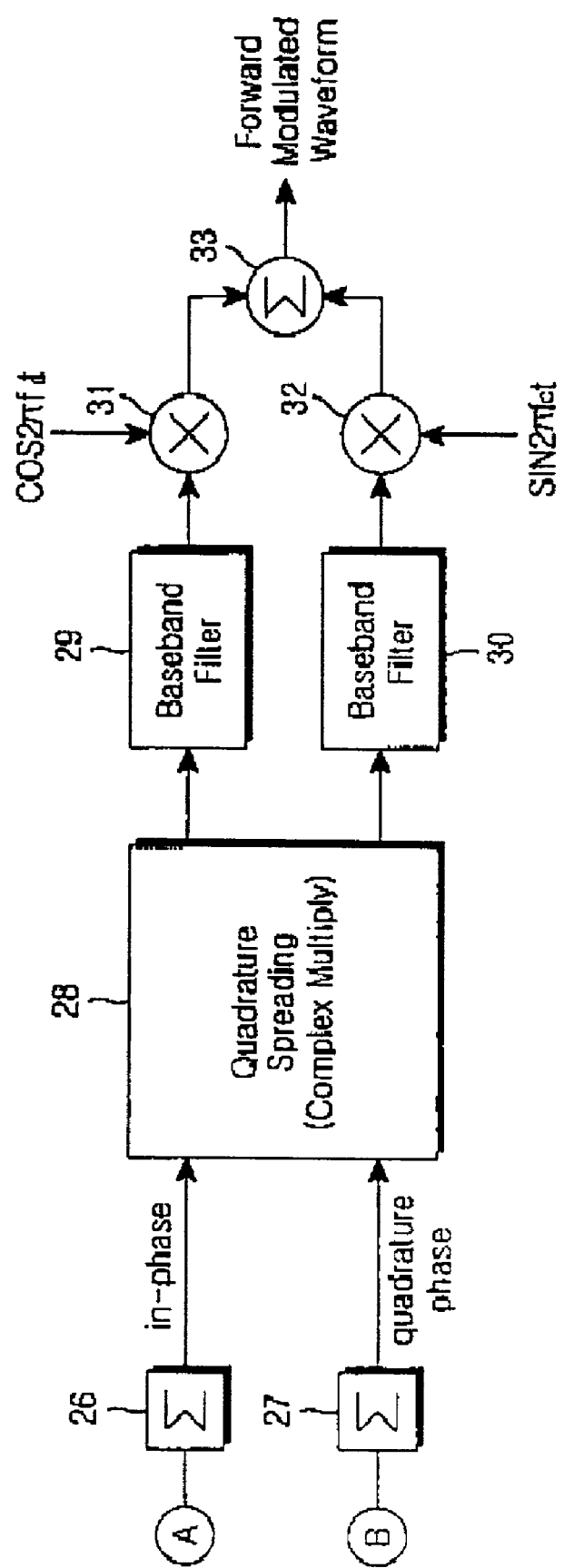

FIGS. 1A and 1B are block diagrams of a downlink transmitter for a DTCH according to an embodiment of the present invention. The downlink transmitter for a DTCH is characterized by transmission of a preamble sub-channel (PSCH) signal, a data traffic sub-channel (DTSCH) signal, and a pilot channel (PICH) signal in time division multiplexing (TDM).

Referring to FIGS. 1A and 1B, a signal point mapper 11 maps preamble symbols to +1 s or −1 s. A Walsh spreader 12 spreads symbols received from the signal point mapper 11 with a 64-ary biorthogonal Walsh code (or sequence) corresponding to a user-specific MAC ID (Identification) (or index) and outputs a first channel sequence and a second channel sequence. A sequence repeater 13 repeats the channel sequences according to a transmission rate. Since the repetition time is up to 16, a PSCH signal can last for 64 to 1024 chips in one slot of a DTCH. A time division multiplexer (TDM) 25 multiplexes (I, Q) sequences received from the sequence repeater 13 with PICH and DTSCH sequences.

A scrambler 14 scrambles a channel-coded bit sequence and a channel interleaver 15 interleaves the output sequence of the scrambler 14. The size of the channel interleaver 15 varies with the length of a PLP. An M-ary symbol modulator 16, operating as a QPSK (Quadrature Phase Shift Keying), 8-PSK (Phase Shift Keying), or 16-QAM (Quadrature Amplitude Modulation) modulator according to a transmission rate, modulates the interleaved symbols to M-ary symbols. The M-ary symbol modulator 16 may use a different modulation scheme on a PLP basis on which a transmission rate is changed. A sequence repeater/symbol puncturer 17 performs sequence repetition and symbol puncturing on (I, Q) sequences of the M-ary symbols output from the M-ary symbol modulator 16. A symbol demultiplexer (DEMUX) 18 demultiplexes the output of the sequence repeater/symbol puncturer 17 using one of N Walsh codes available to the DTSCH. N is variable and the mobile station determines a transmission rate for the base station according to N. The mobile station reports the determined transmission rate to the base station, that is, requests the determined transmission rate to the base station. Therefore, the mobile station can find out what Walsh code is assigned to the current received DTSCH. A Walsh spreader 19 spreads (I, Q) symbols received from the symbol DEMUX 18 with a predetermined Walsh code according to the channels. A Walsh channel gain controller 20 controls the gains of (I, Q) sequences received from the Walsh spreader 19. A Walsh chip level summer 21 sums N (I, Q) sequences received from the Walsh channel gain controller 20 in chips. The TDM 25 multiplexes the summed (I, Q) chip sequence with the PICH and the PSCH.

A signal point mapper 22 maps pilot symbols to +1 s and −1 s. A Walsh spreader 23 spreads the output symbols of the signal point mapper 22 with a 128-ary Walsh code assigned to the PICH. A PICH gain controller 24 controls the gain of a sequence received from the Walsh spreader 23. An I chip sequence output from the PICH gain controller 24 is multiplexed with the PSCH and the DTSCH in the TDM 25.

The TDM 25 multiplexes the I channel signal of the PICH received from the sequence repeater 13, the I channel signal of the DTSCH received from the Walsh chip level summer 21, and the I channel signal of the PSCH received from the gain controller 24 and outputs the multiplexed signal as signal A. The TDM 25 also multiplexes the Q channel signal of the PICH received from the sequence repeater 13, the Q channel signal of the DTSCH received from the Walsh chip level summer 21, and the Q channel signal of the PSCH being 0 and outputs the multiplexed signal as signal B.

A first summer 26 sums the first channel signal components, namely, the I channel signal components of the DTCH, a DTMACCH (Data Traffic MAC Channel), and a CPCCH (Common Power Control Channel) at a chip level. The I channel signal component of the DTCH is signal A output from the TDM 25 shown in FIG. 1A. A second summer 27 sums the second channel signal components, namely, the Q channel signal components of the DTCH, the DTMACCH, and the CPCCH at a chip level. The Q channel signal component of the DTCH is signal B output from the TDM 25 shown in FIG. 1A.

A quadrature spreader 28 complex-spreads (or complex-multiplies) the I and Q channel signals received from the first and second summers 26 and 27 with a first channel (I-ch) spreading sequence and a second channel (Q-ch) spreading sequence, respectively. Baseband filters 29 and 30 baseband-filter a first channel signal and a second channel signal received from the quadrature spreader 28, respectively. A first frequency upconverter 31 upconverts the output of the baseband filter 29 to an RF (Radio Frequency) band by multiplying it by cos $2\pi fct$. A second frequency upconverter 32 upconverts the output of the baseband filter 30 to an RF (Radio Frequency) band by multiplying it by sin $2\pi fct$. A summer 33 sums the output signals of the first and second frequency upconverters 31 and 32. The summed signal is transmitted through an antenna (not shown).

Figure 2:
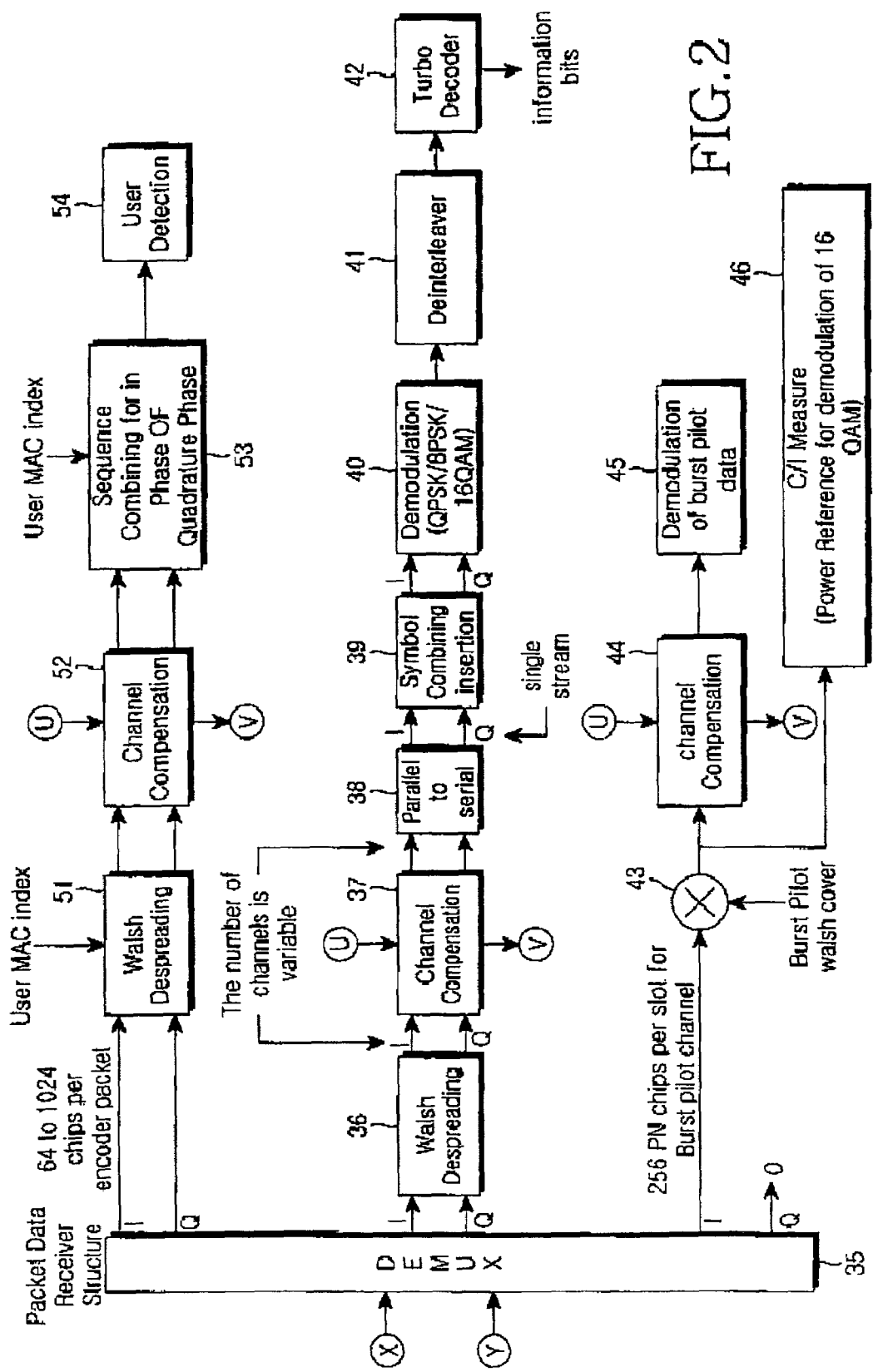
FIG. 2 is a block diagram of a mobile station receiver according to the present invention.

FIG. 2 is a block diagram of a downlink receiver for a DTCH in a mobile station supporting multimedia service according to the present invention.

Referring to FIG. 2, an I channel component X and a Q channel component Y output from a quadrature despreader (not shown) are applied to the input of a DEMUX 35. The DEMUX 35 TDM-demultiplexes a DTSCH, a PSCH, and a PICH. Since the PICH occupies a fixed position in each slot, the DTSCH and the PSCH are transmitted in the remainder of the slot with the PSCH followed by the DTSCH.

Demodulation of the PSCH will first be described below.

The PSCH separated in the DEMUX 35 has a variable length according to the data rate of a corresponding downlink signal as described before with reference to FIGS. 1A and 1B. The PSCH was spread with a 64-ary biorthogonal Walsh code corresponding to the MAC ID of a user to receive the downlink signal and transmitted on the I and Q channels according to the user MAC ID. A Walsh despreader 51 despreads the PSCH signal with the 64-ary biorthogonal Walsh code. A channel compensator 52 channel-compensates the output signal of the Walsh despreader 51 using estimated channel information representing an I channel component U and a Q channel component V A symbol combiner 53 combines only the I or Q channel components of the channel-compensated signal according to a MAC index corresponding to the user MAC ID. A user detector 54 received the combined signal from the symbol combiner 53 and determines whether the received downlink signal is for the user.

Secondly, demodulation of the PICH will be described.

The PICH signal of 256 chips per slot is separated in the DEMUX 35. A mixer 43 multiplies the PICH signal received from the DEMUX 35 with a Walsh code assigned to the PICH.

A channel compensator 44 channel-compensates the signal received from the mixer 43 using the estimated channel information representing the I channel component U and the Q channel component V in order to recover the signal loaded on the pilot channel. A demodulator 45 demodulates the channel-compensated signal to burst pilot data. A CIR measurer 46 receives the signal from the mixer 43 and provides an amplitude reference point for QAM demodulation when packet data is QAM-modulated.

Thirdly, demodulation of the DTSCH will be described below.

The DTSCH is positioned in the remainder of one slot except for portions for the pilot channel signal and the PSCH signal. The DTSCH signal is separated in the DEMUX 35. A Walsh despreader 36 despreads the DTSCH signal with a Walsh code assigned to the DTSCH and outputs as many parallel signals as the length of the Walsh code. A channel compensator 37 channel-compensates the output of the Walsh despreader 36 using the estimated channel information representing the I channel component U and the Q channel component V A parallel-to-serial converter (PSC) 38 converts the parallel signals received from the channel compensator 37 to a serial signal and a symbol combiner/inserter 39 performs symbol combining or symbol insertion on the serial signal received from the PSC 38 in correspondence with repetition and puncturing in a base station. A QPSK/8PSK/16QAM demodulator 40 performs QPSK/8PSK/16QAM demodulation on the output of the symbol combiner/inserter 39. A deinterleaver 41 deinterleaves the demodulated signal in the reverse operation of interleaving in an interleaver of the base station. A turbo decoder 42 turbo-decodes the deinterleaved signal, thereby extracting information bits.

The present invention provides a method of determining whether a PLP is transmitted in a single format or in a double format. Hence, the mobile station requests a transmission rate change in a predetermined unit to the base station. The base station then monitors the change history of the mobile station-requested transmission rate and represents it numerically. The base station collects the numerically expressed change history of the transmission rate and determines whether to transmit data in a single format or in a double format. A description is made below of an algorithm of making such a determination and a method of reporting the format of a transmitted PLP to a mobile station.

Figure 3:
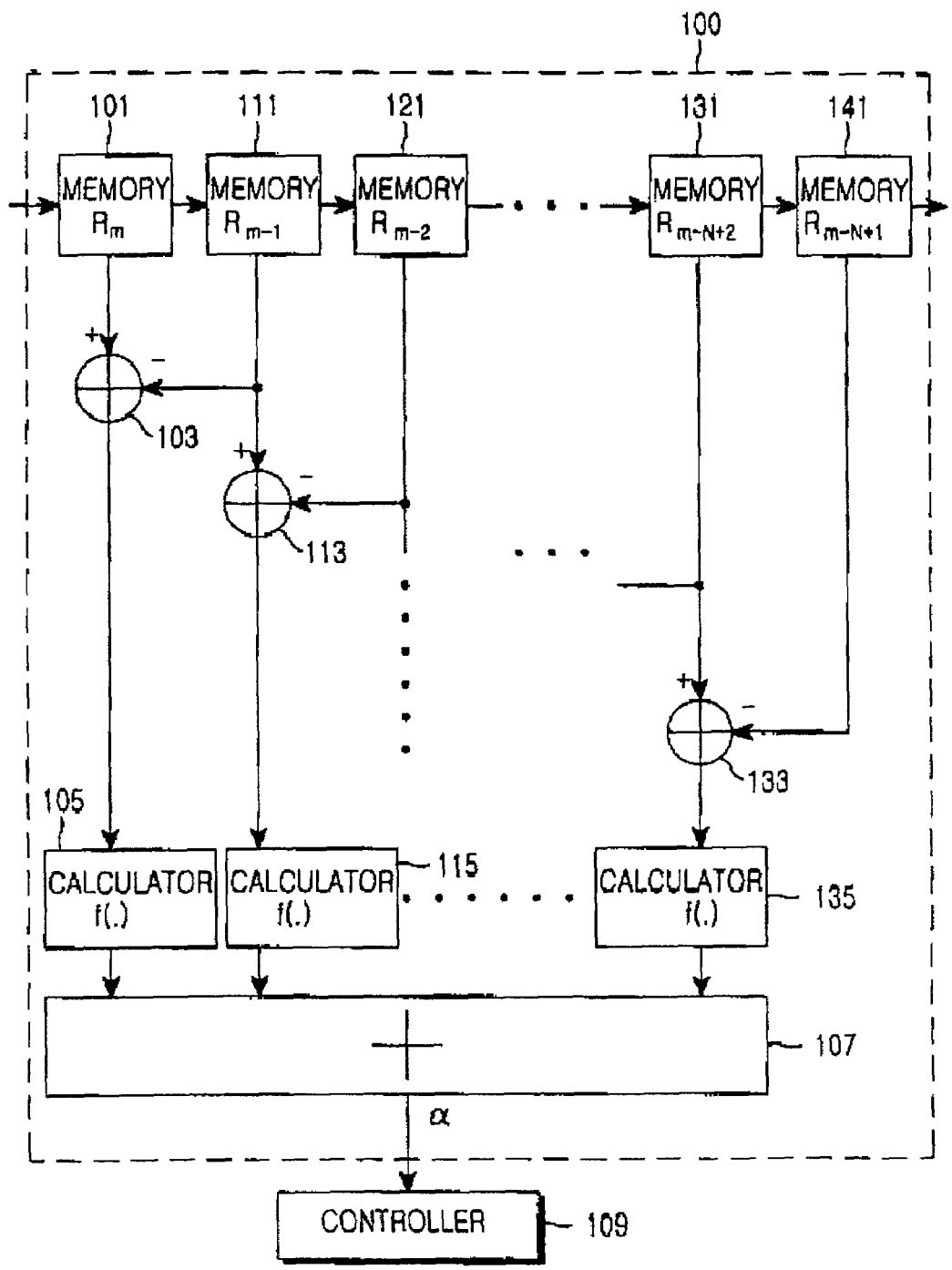
FIG. 3 is a block diagram of a base station for representing the change history of a mobile station-requested data rate numerically according to the present invention.

FIG. 3 is a block diagram of a base station for representing the change history of a mobile station-requested transmission rate numerically according to the embodiment of the present invention.

Referring to FIG. 3, the mobile station transmits a channel state value corresponding to an intended transmission rate to the base station on a uplink DRQSCH (Data Rate request Subchannel). The channel state value may be represented by index $R_m$. $R_m$ is input to a first memory 101 in the base station. Here, the subscript m of $R_m$ indicates the sequence number of a slot being 1.25 ms in duration. The base station has N memories 191, 111, 121, . . . , 131 and 141 for storing indexes corresponding to transmission rates received from the mobile station on the uplink DRQSCH. Each memory is a shift register that is activated in response to a clock signal of a period being the slot duration, 1.25 ms. $R_m$ of the first memory 101 and the negative of the second memory 111, are $-R_{m-1}$, are output and applied to the input of a first adder 103. The first adder 103 outputs the difference between $R_m$ and $R_{m-1}$. $R_{m-1}$ (that is, the sum of $R_m$ and $-R_{m-1}$. $-R_{m-1}$). The output of the first adder 103 is fed to a first calculator 105. $R_{m-1}$ of the second memory 111 and the negative of the third memory, $-R_{m-2}$ are output and applied to the input of a second adder 113. The second adder 113 outputs the difference between $R_{m-1}$ and $R_{m-2}$. The output of the second adder 113 is fed to a second calculator 115. In the same manner, the difference between indexes received every 1.25 ms slot period is calculated and fed to a corresponding calculator. Finally, $R_{m-N+2}$ of the fourth memory 131 and the negative of the fifth memory 141, $-R_{m-N+1}$, are output and applied to the input of a third adder 133. The third adder 133 outputs the difference between $R_{m-N+2}$ and $R_{m-N+1}$. The output of the third adder 133 is fed to a third calculator 135. The first to third calculators 105 to 135 perform a calculation on their input signals by $$f(n)=|n| \tag{1}$$

$$\text{or } f(n)=|n|^2 \ldots \tag{2}$$

Eq. (1) represents the absolute value of an input value and Eq. (2) represents the square of an input value. Each calculator receives an integer value. Therefore, for the input of the same value, Eq. (2) produces the same value as or a higher value than Eq. (1). As the difference between indexes received in 1.25 ms slot intervals is wider, a calculator based on Eq. (2) outputs a higher value than a calculator based on Eq. (1). In other words, Eq. (2) offers a greater weight during numerical representation of changes in a transmission rate as the mobile station-requested transmission rate is drastically changed. Aside from Eq. (1) and Eq. (2), any other operation that can estimate the change of a transmission rate using the difference between indexes in a 1.25 ms slot period can be applied.

A fourth adder 107 sums the outputs of calculators 105 to 135 and outputs the sum as a numerical value representing the change history of the mobile station-requested transmission rate, by which it can be determined whether data is to be transmitted in a single format or in a double format. In the case where the calculators 105 to 135 operate based on Eq. (1), the adder 107 performs the summation by $$\alpha = \sum_{i=m-N+2}^{m} |R_i - R_{i-1}| \quad (3)$$

While Eq. (3) has been given as an embodiment of representing the change history of a mobile station-requested transmission rate as a numerical value, any other operation can be used as long as it represents the change history of the transmission rate numerically using the different between indexes received in a 1.25 ms slot period.

On the other hand, if the calculators 105 to 135 operate based on Eq. (2), the adder 107 performs the summation by $$\alpha = \sum_{i=m-N+2}^{m} (R_i - R_{i-1})^2 \quad (4)$$

While Eq. (4) has been given as another embodiment of representing the change history of a mobile station-requested transmission rate as a numerical value, any other operation can be used as long as it represents the change history of the transmission rate numerically using the different between indexes received in a 1.25 ms slot period.

Consequently, the calculation portion 100 produces a numerical value representing the change history of a mobile station-requested transmission rate by Eq. (3) or Eq. (4).

A controller 109 checks the change history of the transmission rate by receiving the calculation result α of Eq. (3) or Eq. (4). The received value α is compared with a predetermined threshold θ and the format of a PLP is determined according to the comparison result in a later-described method.

Figure 4:
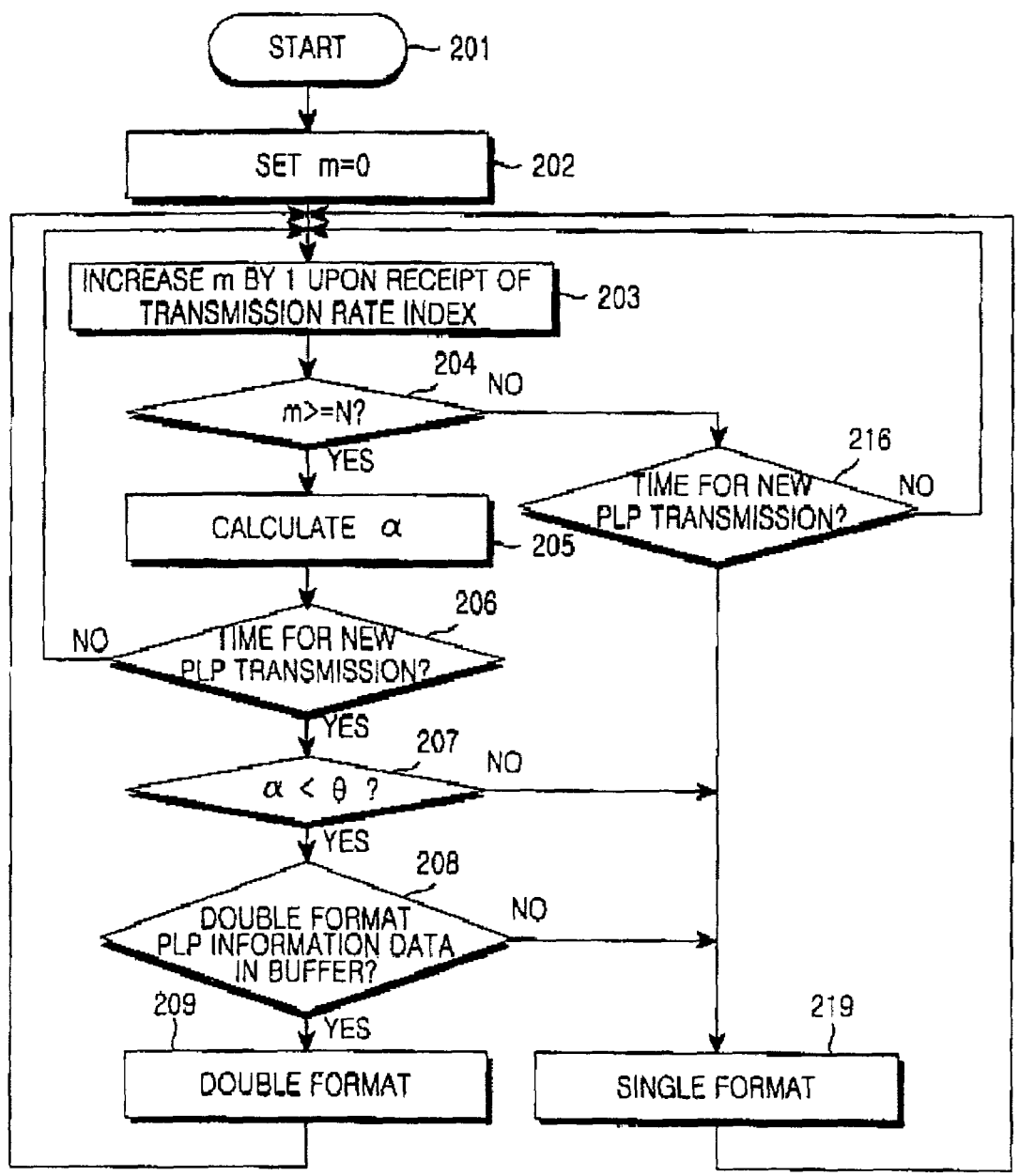
FIG. 4 is a flowchart illustrating a procedure of determining a data transmission scheme according to the present invention.

FIG. 4 is a flowchart illustrating a data transmission method according to the embodiment of the present invention.

The control operation shown in FIG. 4 is carried out when a call proceeds in a user terminal. Referring to FIG. 4, an index m is set to 0 in step 202. Here, m is the sequence number of a slot being 1.25 ms in duration. In step 203, the base station increases the index m by 1 every time it receives an index corresponding to a mobile station-requested transmission rate in the 1.25 ms slot period. The base station compares the index m with a predetermined value N in step 204. N is a time period for which transmission rate changes are monitored and is equal to the number of the memories shown in FIG. 3. If m is greater than or equal to N, the procedure goes to step 205 and if m is less than N, it goes to step 215. This implies that PLP data transmission a predetermined time after the algorithm starts is limited to a single format.

In step 205, the base station calculates the differences between sequentially received mobile station-requested transmission rates and obtains a numerical value α representing the change history of the mobile station-requested transmission rate by processing the differences in an operation that offers the change history of the transmission rate as a numerical value. Then the base station checks whether a new PLP is to be transmitted in step 206. If the base station is supposed to transmit a new PLP, it goes to step 207 and if not, it returns to step 203, which implies that a transmitted PLP is to be retransmitted due to a reception error or some PLP is being transmitted.

In step 207, the base station compares the value α with a predetermined threshold θ. If α is less than θ, the procedure goes to step 208 and if α is greater than or equal to θ, the procedure goes to step 219. In step 208, the base station checks whether sufficient information data exists in a buffer to construct a double-formatted PLP. If a double-formatted PLP can be constructed with the information data in the buffer, the procedure goes to step 209 and, otherwise, the procedure goes to step 219.

In step 209, the base station constructs a PLP with the information data stored in the buffer in a double format according to a mobile station-requested transmission rate and initiates data transmission. The procedure then returns to step 203.

Meanwhile, in step 216, the base station checks whether it is time to transmit a new PLP. If a new PLP is to be transmitted, step 219 is performed and otherwise, step 203 is performed. That is, step 203 is carried out in the case where a transmitted PLP is to be retransmitted due to a reception error or some PLP is being transmitted.

In step 219, the base station constructs a PLP with the information data of the buffer in a single format according to a mobile station-requested transmission rate and initiates data transmission. The procedure then returns to step 203.

With reference to FIGS. 3 and 4, an apparatus and method for determining whether to transmit data in a single format or a double format considering the change history of a mobile station-requested transmission rate have been described in the above. It is necessary to physically notify a mobile station of the format of a PLP transmitted in the above method. While many methods can be contemplated, three of them will be given below as embodiments of the present invention.

In the first embodiment, the mobile station is provided with the components shown in FIG. 3 and operates in the algorithm shown in FIG. 4, so that it can find out the format of a received PLP. This method advantageously obviates the need of notifying the mobile station of the format of the PLP by the base station.

The second embodiment uses a burst pilot transmitted on a PICH. A burst pilot exists in a predetermined time period of a downlink data transmission slot in a mobile telecommunication system to which the present invention is applied. A burst pilot symbol is 0 (or burst pilot symbols are all 0 s) and spread with a predetermined Walsh code prior to transmission. By using the burst pilot, therefore, the mobile station can measure the CIR of a mobile communication channel between the base station and mobile station and obtain an amplitude reference necessary to demodulate a 16QAM-modulated signal. In the mobile telecommunication system according to the present invention, a common pilot, which is provided in an existing IS-95 mobile telecommunication system, as well as the burst pilot is used for the downlink. Therefore, a phase reference necessary to demodulate a QPSK-, 8PSK- or 16QAM-modulated signal can be obtained from the common pilot. Accordingly, the burst pilot symbol can be 0 or 1 (the burst pilot symbols are all 0 s or 1 s) and transmit one-bit information. That is, the base station can report the mobile station of the format of a current transmitted PLP by setting the burst pilot symbol to 0 or 1.

FIG. 5A is a block diagram of a downlink transmitter for transmitting one-bit information on a modified PICH, by which the format of a transmitted PLP is determined between a single format and a double format.

Referring to FIG. 5A, a pilot symbol is set to 0 or 1 depending on whether a PLP to be transmitted is in a single format or in a double format. A signal point mapper 301 maps the pilot symbol 0 or 1 to +1 or −1 under the control of a controller 304. The controller 304 is the same as the controller 109 shown in FIG. 3 in operation and structure. According to a determination made in the procedure of FIGS. 3 and 4, the pilot symbol is set to 0 or 1. If the pilot symbol is 0, it indicates that the PLP is transmitted in the single format and if the pilot symbol is 1, it indicates that the PLP is transmitted in the double format, or vice versa.

A Walsh spreader 302 spreads the output of the signal point mapper 301 with a Walsh code assigned to the PICH. A PICH gain controller 303 controls the gain of the spread sequence received from the Walsh spreader 302.

Figure 5B:
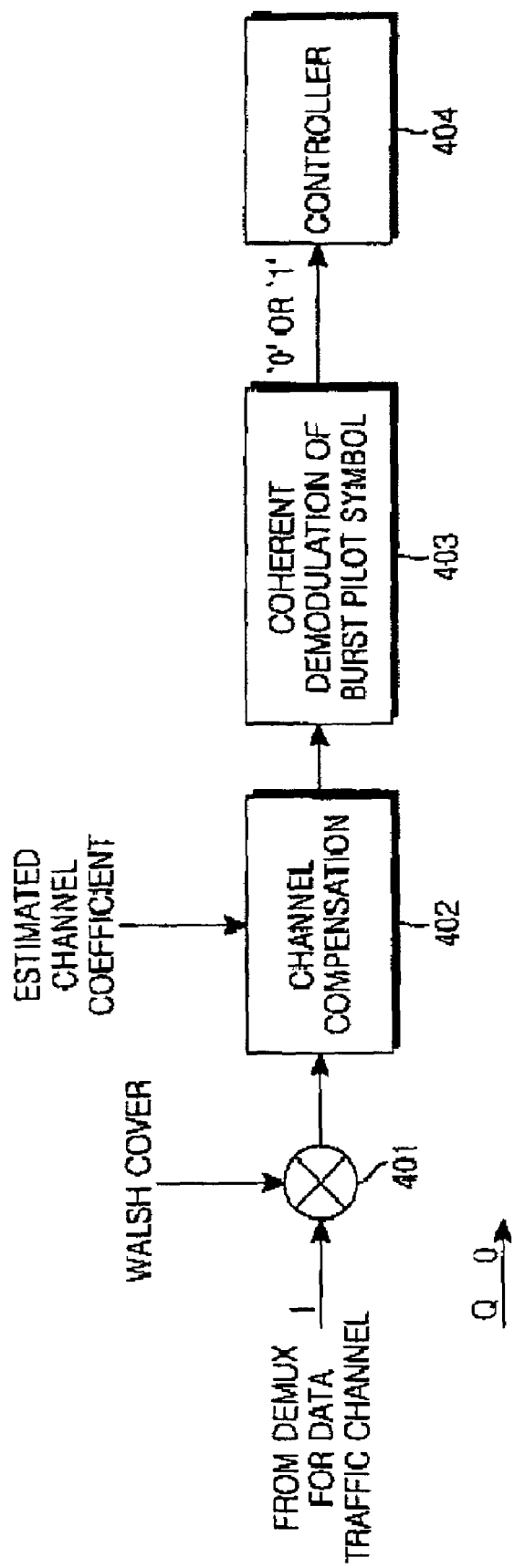
FIG. 5B is a block diagram of an embodiment of a mobile station receiver for finding out a data transmission method in correspondence with the transmitter shown in FIG. 5A.

FIG. 5B is a block diagram of a mobile station receiver for detecting a data transmission method as the counterpart of the transmitter shown in FIG. 5A.

Referring to FIG. 5B, a Walsh despreader 401 despreads a signal received from a DEMUX (not shown) for a DTCH with the same Walsh code as used in the base station. A channel compensator 402 channel-compensates the spread signal using a channel estimated value received from a channel estimator (not shown). A coherent demodulator 403 for a pilot symbol outputs 0 or 1 for the input of the channel-compensated signal.

A controller 404 determines whether a received PLP is in a single format or a double format according to the bit received from the coherent demodulator 403. For an input bit of 0, the controller 404 determines that the PLP is in the single format and for an input bit of 1, it determines that the PLP is in the double format. That is, the controller 404 can find out the format of a current signal which was transmitted after mapping from the base station. This will be described later in more detail referring to FIG. 7.

In a third embodiment, a preamble transmitted on a PSCH is used.

To indicate a corresponding mobile station for which a transmitted PLP is destined, the base station transmits a preamble at the start of each PLP. The preamble is set to 0 or 1 depending on the format of the PLP and spread with an orthogonal Walsh code.

FIG. 6A is a block diagram of a downlink transmitter for transmitting a preamble representing the format of a transmitted PLP.

Referring to FIG. 6A, the base station sets a preamble symbol to 0 or 1 according to the format of a PLP to be transmitted. A signal point mapper 501 maps the preamble symbol 0 or 1 to +1 or −1. The preamble symbol value to be mapped is received from a controller 503, which was determined in the operations of FIGS. 3 and 4. The controller 504 is the same as the controller 109 of FIG. 3 in operation and structure. By constituting a downlink transmitter as shown in FIGS. 5A or 6A, the transmission format of a PLP can be reported to a mobile station. In other words, a value representing the result of a determination made by the algorithm shown in FIG. 4 using information extracted from the structure of FIG. 3 is output in the manner shown in FIG. 5A or FIG. 6A.

A Walsh spreader 502 spreads the output symbols of the signal point mapper 501 with an orthogonal Walsh code or sequence corresponding to a user-specific MAC ID or index. A sequence repeater 503 repeats the spread sequence according to a transmission rate. For the base station to notify the mobile station of the format of a PLP to be transmitted via a PSCH, the mobile station has a receiver that can demodulate the PSCH.

Figure 6B:
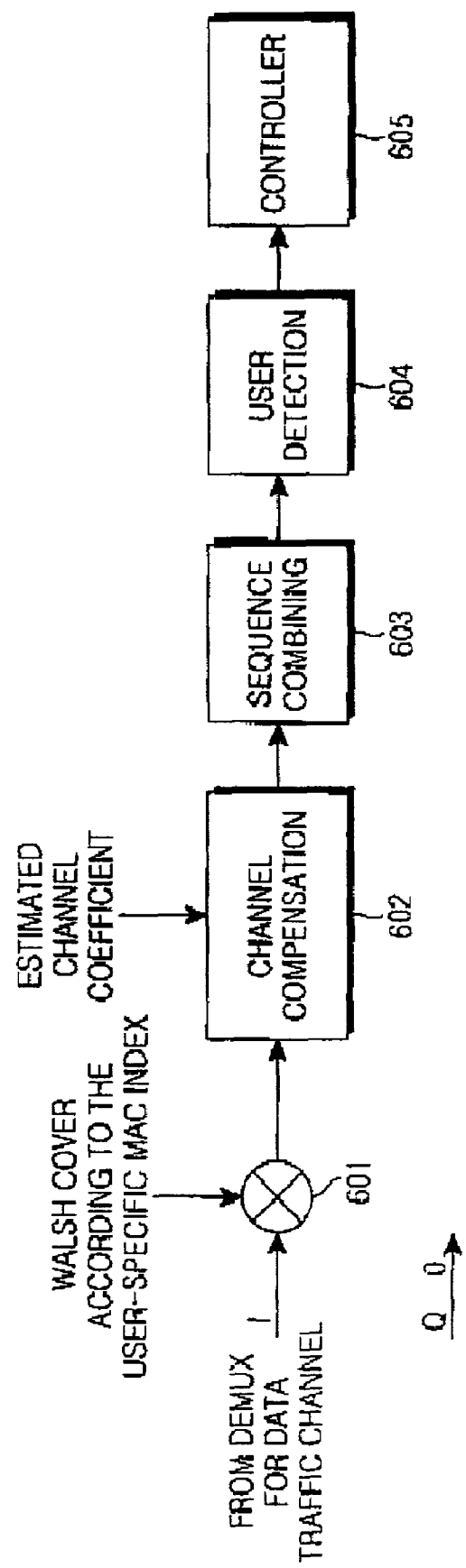
FIG. 6B is a block diagram of another embodiment of the mobile station receiver for finding out a data transmission method in correspondence with the transmitter shown in FIG. 6A.

FIG. 6B is a block diagram of a receiver for receiving a preamble in the case where information about the format of a transmitted PLP is transmitted via the preamble as shown in FIG. 6A.

Referring to FIG. 6B, a Walsh despreader 601 despreads a signal received from a DEMUX (not shown) for a DTCH with a Walsh code corresponding to a user-specific MAC ID. A channel compensator 602 channel-compensates the despread signal using a channel estimated value received from a channel estimator (not shown). A sequence combiner 603 combines sequences according to the repetition time of sequences determined by a transmission rate. A detector 604 receives the output of the sequence combiner 603 and checks whether the received PLP is for the mobile station using the MAC ID.

If the PLP is for the user, a controller 605 extracts PLP information and performs data reception in the single format or in the double format according to a bit indicating the format of the PLP. For example, if the bit is 0, the controller 605 sets a data reception mode to a single format and if the bit is 1, it sets a data reception mode to a double format. The PLP reception in a receiver will be described below referring to FIG. 7.

Figure 7:
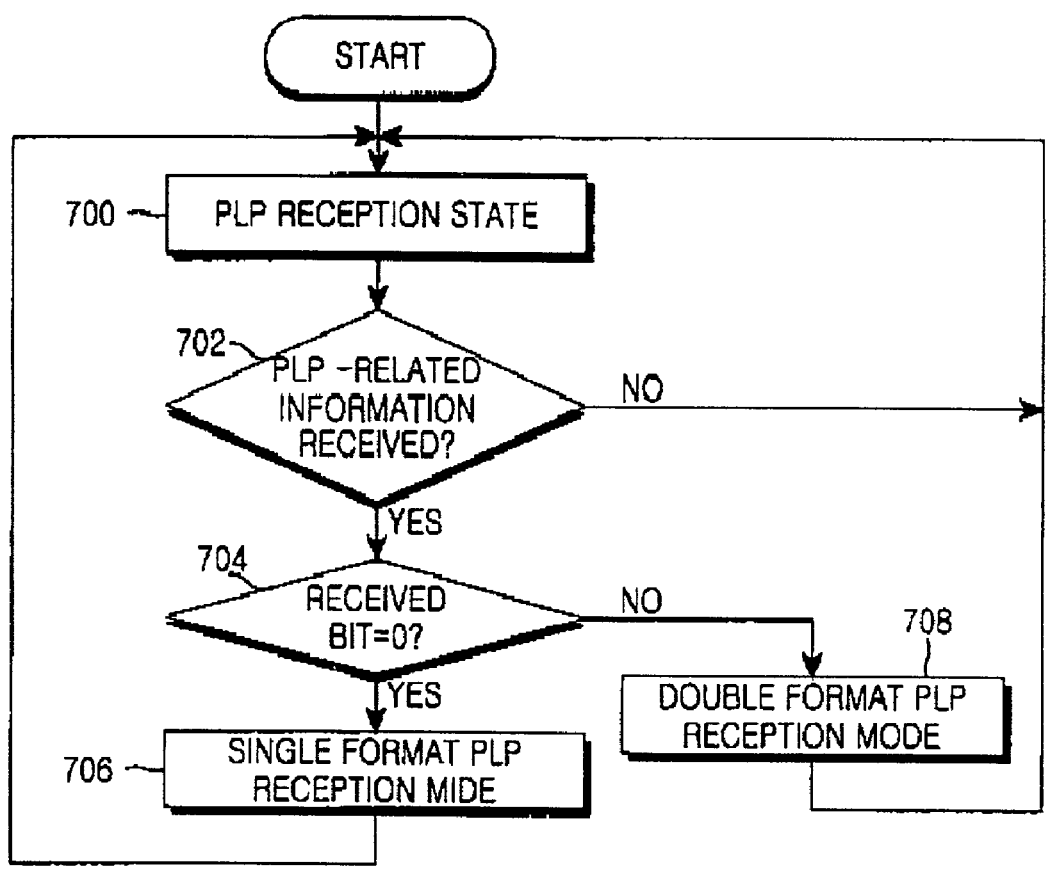
FIG. 7 is a flowchart illustrating a control operation for changing a PLP data reception mode in a receiver according to the embodiments of the present invention.

FIG. 7 is a flowchart illustrating a control operation for changing a PLP data reception mode in a receiver according to the embodiments of the present invention. The following description is made with appreciation that a controller in the receiver acts as the controller 404 of FIG. 5B or the controller 605 of FIG. 6B according to a reception mode.

Referring to FIG. 7, the controller is in a PLP reception state in which a PLP can be received in a single format or in a double format in step 700, and receives PLP-related information in step 702. The PLP-related information is a bit indicating the format of a PLP, received in the manner shown in FIG. 5B or FIG. 6B. In step 704, the controller checks whether the bit is 0, that is, whether the PLP was transmitted in a single format or in a double format. If the bit is 0, the controller sets the receiver to a single format PLP reception mode in step 706 and returns to step 700. If the bit is 1, the controller sets the receiver to a double format PLP reception mode in step 708 and returns to step 700.

In the above-described method, the mobile station can find out the format of a PLP transmitted from the base station and sets the receiver to a corresponding reception mode. Therefore, the receiver can receive data without errors.

In accordance with the present invention as described above, data transmission is efficiently controlled, the transmission efficiency of packet data for a user is increased, and as a result, system efficiency is increased in a mobile telecommunication system supporting multimedia service to simultaneously transmit voice and data.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A method of determining the transmission format of packet data between a first format and a second format longer than the first format based on channel state values received from a mobile station, comprising the steps of:
   (a) sequentially storing received channel state values;
   (b) calculating the differences between all adjacent channel state values;
   (c) summing the differences calculated between all adjacent channel state values;

(d) comparing the sum with a predetermined threshold; and (e) determining the transmission format of packet data according to whether the sum is greater than the predetermined threshold.

2. The method of claim 1, wherein the determining the transmission format of packet data further comprises the steps of:

(f) determining the transmission format of the packet data as the first format if the sum is greater than or equal to the predetermined threshold; and (g) determining the transmission format of the packet data as the second format if the sum is less than the predetermined threshold.

3. The method of claim 2, wherein if the sum is less than the threshold and there exists insufficient transmission data, the transmission format of the packet data is determined as the first format.

4. The method of claim 2, wherein if the number of the received channel state values is less than a predetermined value, the transmission format of the packet data is determined as the first format and if the number of the received channel state values is greater than or equal to the predetermined value, the steps (c) through (g) are performed.

5. The method of claim 2, further comprising the step of notifying a receiver of the determined transmission format of the packet data.

6. The method of claim 5, wherein, the transmission format of the packet data is notified by a preamble signal.

7. The method of claim 5, wherein the transmission format of the packet data is notified by a burst pilot signal.

8. The method of claim 2, wherein the packet data is transmitted in the first format for a predetermined time period after initial transmission.

9. An apparatus for determining the transmission format of packet data between a first format and a second format longer than the first format based on channel state values received from a mobile station, comprising:

a calculation portion for determining the change history of received channel state values representing a change in mobile station-requested transmission rate as received from the mobile station as a numerical value; and a controller for determining the transmission format of the packet data as the first format if the output of the calculation portion is greater than or equal to a predetermined threshold and determining the transmission format of the packet data as the second format if the output of the calculation portion is less than the predetermined threshold.

10. The apparatus of claim 9, wherein the calculation portion comprises:

at least two memories for sequentially storing channel state values;

a plurality of first calculators for calculating the differences between the channel state values stored in the memories having adjacent channel state values;

a plurality of second calculators for numerically expressing changes in the channel state values using the differences; and an adder for adding the outputs of the second calculators to receive a sum, and outputting the sum to the controller.

11. The apparatus of claim 10, wherein the second calculators calculate the absolute values of the outputs of the first calculators.

12. The apparatus of claim 10, wherein the second calculators square the outputs of the first calculators.

13. The apparatus of claim 9, wherein the controller checks whether there are enough transmission data when the packet data can be transmitted in the second format and carries out data transmission in the second format only if there exists transmission data.

14. The apparatus of claim 9, wherein if the transmission format of the packet data is determined, information indicating the determined transmission format is transmitted by a preamble transmitter.

15. The apparatus of claim 9, wherein if the transmission format of the packet data is determined, information indicating the determined transmission format is transmitted by a burst pilot transmitter.

* * * * *